United States Patent [19]

Levy

[11] Patent Number: 4,622,253

[45] Date of Patent: Nov. 11, 1986

[54] THERMAL LAMINATED LINING AND METHOD OF MANUFACTURE

[76] Inventor: Harry Levy, 2119-04 Stewart Rd., Jamaica, N.Y. 11427

[21] Appl. No.: 660,448

[22] Filed: Oct. 12, 1984

[51] Int. Cl.$^4$ ............................................. D03D 27/00
[52] U.S. Cl. ..................................... 428/91; 26/2 R; 28/107; 156/72; 428/95; 428/234; 428/300
[58] Field of Search ................... 428/91, 234, 300, 95; 156/72; 26/2 R; 28/107

[56] References Cited

U.S. PATENT DOCUMENTS 4,062,993 12/1977 Seward ................................. 428/95

Primary Examiner—Marion C. McCamish
Attorney, Agent, or Firm—Edward R. Weingram

[57] ABSTRACT

The present invention provides a textured non-woven insulating laminate lining material which is light weight. The material has a layer of flexible plastic material, on one side upon which is placed a thin layer of thermally reflective metal. Fiber wadding is placed on the side remote from the metal reflective layer, with fibers extending from the wadding through the plastic and reflective layer to form a light nap on the side of the reflective layer, to not only give the material the desirable characteristics of touch and absorbancy normally associated with fine fabric lining and enhance the insulating properties of the material, but also act as a wick, picking up moisture, e.g. perspiration, and transmitting it through the laminate to the fiber, away from the body. The nap is of sufficient weight to permit adequate wicking while permitting exposure of the reflective metallic material. Additionally, the needle punching of the individual fibers through the plastic and metal layer helps secure the wadding to the back of the plastic and ties in the layer of thin metal to the plastic substrate. The layer of metal can additionally be secured to the base plate by means of vacuum plating or laminating.

Further, the present invention sets forth a method of manufacturing such material by placing a layer of thermally reflective metal on one surface of a strong flexible non-resilient thin plastic sheet, and placing a layer of fiber wadding on the opposite surface of the flexible thin plastic sheet. The layer of fiber wadding is needle punched, to force individual fibers through the thin plastic sheet and the layer of reflective metal, to produce the laminate, and to provide a fiber nap extending from the thin plastic metal. The layer of reflective metallic material may also be secured to the thin plastic substrate by vacuum plating or bunding prior to the application of the fiber wadding.

32 Claims, 3 Drawing Figures

U.S. Patent  Nov. 11, 1986  4,622,253
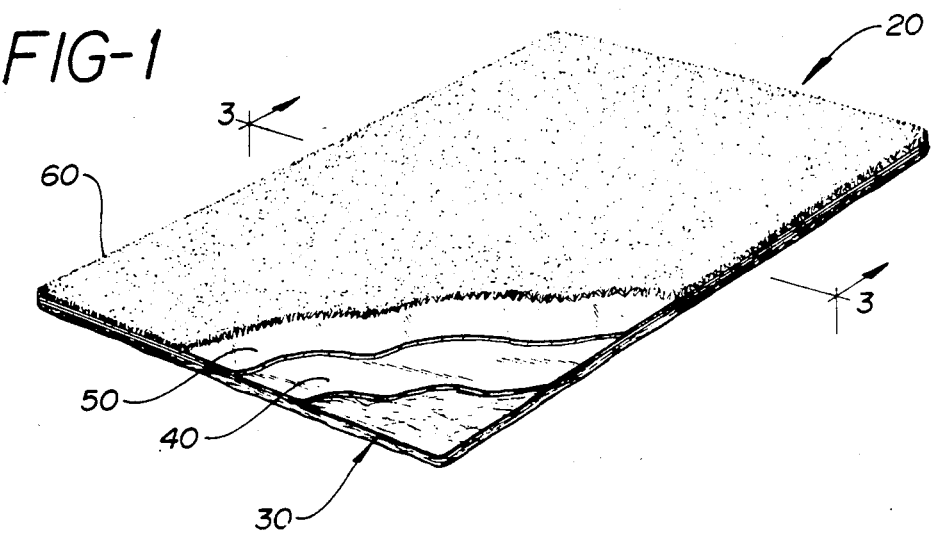
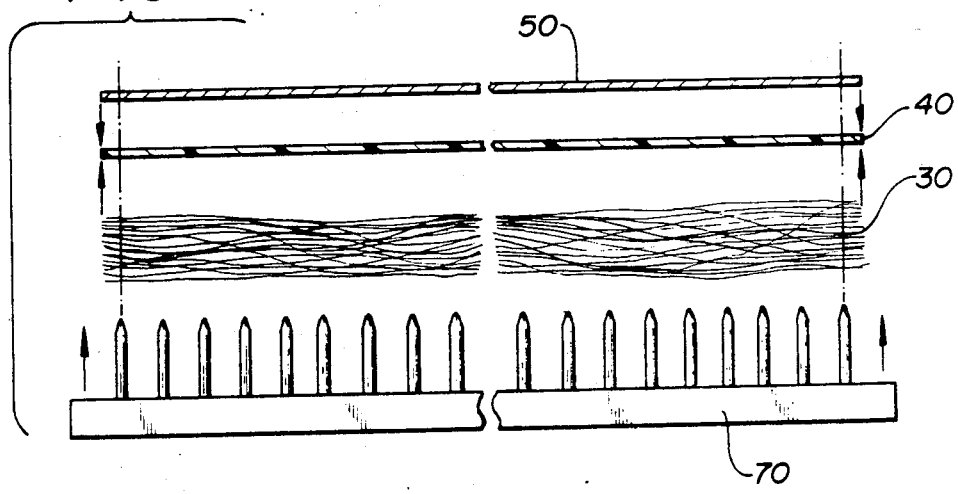
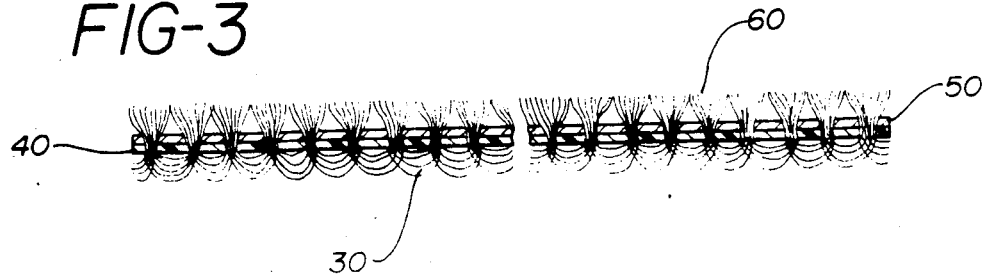

THERMAL LAMINATED LINING AND METHOD OF MANUFACTURE

BACKGROUND OF THE INVENTION

1. Field of the Invention

This invention relates to laminated fabric materials, especially for use as a lining in clothing to provide insulation for the wearer and to protect against moisture build up against the skin of the wearer.

This invention also relates to the method of manufacturing a laminated fabric material, especially for use as a lining in clothing.

2. Description of Prior Art

Linings are often put in apparel for purposes of comfort, durability, and insulation. This is especially true in apparel that is used in colder temperature areas. The linings provide for thermal insulation and are often used to capture and form various insulating materials, such as down or other loose materials that provide air pockets as an insulator.

The linings also are often non-porous, to provide a wind screen to assist in the capture of body heat of the wearer of the garment. However, because these linings are non-porous, moisture from perspiration, for instance, collects on the surface and remains in contact with the body of the wearer.

Linings often prove difficult, either to manufacture or to properly install in the garment, or once installed to provide the durability and insulating properties necessary. For example, plush linings--the types used in down jackets or such--require an extensive amount of individual sewing in order to form pockets in which the light insulating material is captured. This material must be packed and blended in a uniform manner, often by hand, and then a separate intricate sewing procedure carried out to form the appropriate containers or pockets. Once the garment is in use, it is notorious that the individual threads, which form the design to form the various pockets, start unraveling and the insulating material then becomes free to travel within the lining of the jacket, and the lining loses much of its effectiveness. Additionally, such linings are bulky and often uncomfortable for the wearer.

The non-porous windscreen type of linings also have proved to be less than satisfactory since they usually do not absorb moisture. Therefore, if the wearer of the garment perspires, the perspiration stays on the inside of the jacket, in contact with the skin of the wearer, making him feel uncomfortable.

Attempts to use reflective materials in the lining in order to reflect back the body heat to assist in the thermoinsulation procedures have often been unsuccessful. The reflective material must be flexible enough to provide comfort, but often thin layers of reflective metals tend to crack or break so as to scratch or irritate the wearer. Also, they are subject to corrosion from the normal prespiration of the wearer.

With respect to the manufacturing of these lining materials, as mentioned above, they often require an inordinate amount of hand work in their assembly and manufacture, which leaves the manufacturing process susceptible to wide variations in the properties of the finished product and its quality control. Additionally, the actual fabrication process often requires handling large quantities of loose bulk material which is difficult to effectively manipulate, and which can produce health hazards because of excessive amounts of dust generated from such material.

More specifically, there are numerous prior art references which describe insulating fabric laminates, see for example, the following U.S. Pat. Nos.
3,222,243 to Gaston et al;
3,461,026 to Schick;
4,062,993 to Seward;
4,170,676 to Thomas;
4,315,048 to Beghelli et al;
4,395,455 to Frankosky;
4,420,521 to Carr;
4,433,019 to Chumbley; and
4,446,189 to Romanek.

None of these references teach or suggest the insulating fabric of this invention, the combined advantages obtained therefrom, and the unique process of making this fabric.

The most relevant reference is Seward. Seward teaches the manufacture of carpeting using a laminate formed of a heavy base fabric with a heavy foil overlay with a thick pile of heavy fiber batting placed on top of the foil and then some of the batting is needle punched through the layers to provide a continuous layer of fibers on the underside of the base fabric. This continuous layer of fiber bat on the underside of the fabric base is used for adhering the laminate to a latex base after the laminate has been needle punched or power tufted to provide the relatively thick and heavy rug nap, and to anchor the rug nap into the latex. The upper layer of densified non-woven bat is used to fill in the spaces between the fibers forming the rug tufts and is the receptacle for dye in order to aesthetically disguise the spaces between the rug tufts. The metallic foil is used primarily during the manufacturing process or pallet tufting of the carpet fibers to act as a heat sink to dissipate the frictional heat of the tuft fibers being forced through the laminate which could either ignite or melt the materials forming the laminate.

The metallic foil serves absolutely no function of insulation for the finished product as is the case in the present invention. Additionally, as pointed out above, the metallic layer is completely buried and has no relationship with the ambient environment of the material, i.e., it is non-reflective and covered.

SUMMARY OF THE INVENTION

Accordingly, in order to overcome the problems of the prior art, the present invention provides a textured non-woven insulating laminate lining material which is light weight. The material has a layer of flexible plastic material, on one side upon which is placed a thin layer of thermally reflective metal. Fiber wadding is placed on the side remote from the metal reflective layer, with fibers extending from the wadding through the plastic and reflective layer to form a light nap on the side of the reflective layer, to not only give the material the desirable characteristics of touch and absorbancy normally associated with fine fabric lining and enhance the insulating properties of the material, but also act as a wick, picking up moisture, e.g. perspiration, and transmitting it through the laminte to the fiber, away from the body. The nap is of sufficient weight to permit adequate wicking while permitting exposure of the reflective metallic material. Additionally, the needle punching of the individual fibers through the plastic and metal layer helps secure the wadding to the back of the plastic and ties in the layer of thin metal to the plastic substrate. The layer of metal can additionally be secured to the base plate by means of vacuum plating or laminating.

Further, the present invention sets forth a method of manufacturing such material by placing a layer of thermally reflective metal on one surface of a strong flexible non-resilient thin plastic sheet, and placing a layer of fiber wadding on the opposite surface of the flexible thin plastic sheet. The layer of fiber wadding is needle punched, to force individual fibers through the thin plastic sheet and the layer of reflective metal, to produce the laminate, and to provide a fiber nap extending from the thin plastic metal. The layer of reflective metallic material may also be secured to the thin plastic substrate by vacuum plating or bunding prior to the application of the fiber wadding.

Accordingly, it is an object of the present invention to provide a material suitable for use as a lining for garments or apparel, for instance, which is light, sturdy, durable, and economic to manufacture.

It is another object to provide a material suitable for use as a lining for garments or apparel which is easy to work with.

Yet another object, is to provide a material suitable for use as a lining for garments or apparel which is a good heat insulator.

Yet another object, is to provide a material suitable for use as a lining for garments or apparel which dyes not get damp or clammy against the body from the perspiration of the wearer.

Yet another object, is to provide a material suitable for use as a lining for garments or apparel which has reflective properties to reflect body heat back to the wearer.

Yet another object, is to provide a material suitable for use as a lining for garments or apparel which has a nice feel or desirable touch to the wearer and will not scratch or irritate the wearer.

Yet another object, is to provide a material suitable for use as a lining for garments or apparel which is easy to manufacture.

Yet another object, is to provide a material suitable for use as a lining for garments or apparel which absorbs moisture.

Yet another object, is to provide a material suitable for use as a lining for garments or apparel which is not bulky.

Yet another object, is to provide a material suitable for use as a lining for garments or apparel which does not require chain-stiching to keep the insulation in place.

Yet another object, is to provide a material suitable for use as a lining for garments or apparel which holds the insulation in place uniformly over the entire area of the insulation.

Yet another object, is to provide a material suitable for use as a lining for garments or apparel which can be used to make very light garments.

Yet another object, is to provide a material suitable for use as a lining for garments or apparel which is wind-resistant.

Yet another object, is to provide a material suitable for use as a lining for garments or apparel which can be easily stored for extended periods of time and handled easily.

Yet another object, is to provide a material suitable for use as a lining for garments or apparel in which the quantity or extent of the absorbant material can be easily adjusted depending upon the needs of the application.

Yet another object, is to provide a material suitable for use as a lining for garments or apparel which is aesthetically pleasing.

Yet another object, is to provide a material suitable for use as a lining for garments or apparel which has absorbant wick-like fibers in contact with the skin of the wearer.

Yet another object, is to provide a material suitable for use as a lining for garments or apparel which does not easily delaminate during normal wear.

Yet another object, is to provide a material suitable for use as a lining for garments or apparel which allows reflection but doesn't expose the reflecting surface to wear, cracking, or dulling from normal use.

Yet another object, is to provide a material suitable for use as a lining for garments or apparel which protects the reflective surface from corrosion and abrasion from the body of the wearer.

Yet another object, is to provide a material suitable for use as a lining for garments or apparel in which the length and/or density of the nap of the fibers in contact with the wearer can be varied in the manufacture to accommodate the needs of the application.

Yet another object, is to provide a material suitable for use as a lining for garments or apparel in which the cushioning material can also be used to secure the laminate.

Yet another object, is to provide a material suitable for use as a lining for garments or apparel in which the reflectivity and absorbancy can be easily varied.

Yet another object, is to provide a material suitable for use as a lining for garments or apparel which is very thin in relation to the amount of insulation that it produces.

Yet another object, is to provide a material suitable for use as a lining for garments and apparel which resists the wearing away of the reflective layer.

Additionally, it is an object of the present invention to provide a method for manufacturing an insulating material which uses commonly available materials and manufacturing process in a new and unique combination.

It is yet another object of the present invention, to provide a method for manufacturing an insulating material which combines commonly available processing steps to produce new material with unexpected results.

It is yet another object of the present invention, to provide a method for manufacturing an insulating material in which it is easy to vary the amount of cushioning or absorbing material.

It is yet another object of the present invention, to provide a method for manufacturing an insulating material in which the absorbancy of the finished product can be easily adjusted during the manufacturing process.

It is yet another object of the present invention, to provide a method for manufacturing an insulating material which requires a minimum amount of hand operations.

It is yet another object of the present invention, to provide a method for manufacturing an insulating material which is highly automated, and as such, very accurate and easily controlled.

These and other objects will become apparent from the following descriptions:

BRIEF DESCRIPTION OF THE DRAWINGS

FIG. 1 shows a finished laminated insulated liner, with a cut-a-way showing the metallic layer, a middle layer of polymeric or plastic sheet, and a fabric layer which has been needle-punched through the plastic and reflecting sheets to form the final composite laminate.

FIG. 2 shows the layers before they are needle-punched together. The needles are also shown.

FIG. 3 is a cross section of the finished product showing the pull-through fibers (napping) on the surface of the aluminum layer.

DESCRIPTION OF THE PREFERRED EMBODIMENT

The textured non-woven insulating laminate fabric of this invention comprises, as a first layer or base material, a layer of a continuous pliable non-woven non-metallic material referring to FIGS. 1-3, this is generally referred to as 40. This fabric base 40 may be composed of any of a wide variety of materials, either woven or non-woven, of natural or synthetic origin. Thus the base material may consist of diverse materials such as jute, cotton, wool, rayon, nylon, polypropylene, polyethylene, polyester, acrylics, or modified acrylics, or mixtures thereof. The highly preferred base material is an extremely high density polyethylene, known as Tyvek (trademark of E. I. Dupont DeNemours), and in particular Tyvek 14. The thickness of this base material is ordinarily in the range of about 0.05 inch to about 0.010 inches, and in the preferred embodiment of this invention about 0.08 inches. This base material is generally moisture impermeable, pliable, puncturable, flexible, and quite strong, e.g., tear resistant.

A continuous layer of heat reflective metal foil 50 is bonded to or layed over one side of the pliable non-woven non-metallic sheet 40. This foil sheet 50 is a reflective pliable metallic foil, such as an aluminum foil. The metallic foil is usually in the range of thickness from about 0.,005, to about 0.010 inches, and in the preferred embodiment herein about 0.0075 inches.

A layer of fiber wadding 30 is placed on the other side of the non-woven non-metallic sheet 40. The fiber wadding 30 can be composed of natural or synthetic fibers, such as cotton, wool, rayon, nylon, polypropylene, polyester, acrylic fibers, modified acrylics, or mixtures of various fibers. Typically the length of the fibers in this fiber wadding can have a wide range.

Many densities and thicknesses of wadding are suitable. In the preferred embodiment the wadding is a commerically available wadding of polyester with a weight of 3 ounces per square yard and a thickness of approximately a quarter of an inch.

A nap of fibers 60 extends from the layer of metal foil 50. The nap 60 is formed from fibers of the layer of wadding 30 passing through the layer of continuous pliable non-woven non-metallic material 40 and the layer of metal foil 50. The fibers of the nap 60 act to carry moisture past the reflective sheet 50 and layer of pliable continuous non-woven non-metallic material 40 to draw water or perspiration from the wearer to the outer layer.

The layer of continuous pliable non-woven non-metallic material 40, the heat reflective metal foil 50, and the fiber nap 30 are bonded together mechanically by means of needle punching, wherein a plurality of needles 70 are punched through the composite of fiber wadding 30, foil 50, and base material 40, as the composite is incrementally moved between strokes of the needles 70. Fiber strands 60 are pulled or pushed to the top of the metallic layer 50, leaving a securely mechanically bonded composite which, becomes covered with a nap of fibers 60 from the fiber wadding 30 below.

The thickness of the wadding 30 placed upon the base material 40 is generally, many times, the thickness desired in the final product as the needle punching operation substantially reduces the thickness of the composite as an incident to interlocking of the fibers.

EXAMPLES

The following tests were performed on the preferred insulating laminate fabric of this invention (Tyvek ®-14, aluminum foil 0.075 inches thick, 3 oz. polyester-wadding) and demonstrate the superior properties of this fabric.

THERMAL TRANSMITTANCE OF TEXTILE MATERIALS BETWEEN GUARDED HOT-PLATE and COOL ATMOSPHERE (ASTM D 1518)

84.75 Mean Temperature of Test, ° F.
1.33 $U_{bp}$, Thermal Transmittance of Bare Plate
0.446 $U_1$, Thermal Transmittance of Plate and Fabric Combined
0.671 $U_2$, Thermal Tranmsittance of Fabric Only
1.490 R Value, Thermal Resistance of Fabric Alone
0.764 Clo, Insulation Value

| TENSILE STRENGTH (Grab) (ASTM D 1682) | |
|---|---|
| WARP | FILLING |
| 16.0 | 20.0 |
| 18.0 | 16.0 |
| 14.0 | 20.0 |
| 16.0 | 15.0 |
| 14.0 | 18.0 |
| Average: 15.6 lbs. | 17.8 lbs. |

| TEAR STRENGTH (Tongue) (ASTM D 2261) | |
|---|---|
| ACROSS WARP | ACROSS FILLING |
| R.T. | R.T. |
| R.T. | R.T. |
| R.T. | R.T. |
| R.T. | R.T. |
| R.T. | R.T. |

R.T. = RESISTS TEAR

| BURSTING STRENGTH (Ball) (ASTM D 3787) |
|---|
| 50.0 |
| 42.0 |
| 32.0 |
| 36.0 |
| 45.0 |
| Average: 4.10 lbs. |

| MOISTURE VAPOR TRANSMISSION (Grams/Hour/Square Meter) | |
|---|---|
| J. C. PENNY METHOD | |
| 933.2 | 5 |

As can be seen from the above description, it is clear that all of the objects of the invention are accomplished by the present invention.

The material of the invention is suitable for use as a lining for garments or apparel and is easy to work with. The lining is a good heat insulator and it does not get damp or clammy against the body from the perspiration of the wearer. Further, the material has reflective properties which reflect body heat back to the wearer, and therefore, takes it an extremely efficient material for an insulation in the lining of apparel. This is produced by the nap coacting with the reflection layer to maintain reflectivity. However, even though it has a foil surface, the material has a nice feel or touch to the wearer and will not scratch or irriate the wearer. The material is easy to work with and to use in manufacturing processes. It is not bulky and does not require chain stitching to keep the fabric in tact. However, it does allow for moisture absorption to enhance the comfort of the wearer. Additionally, the structure of the material tends to make the various layers adhere fairly closely to each other without delamination or separation of the various layers. The finished material is relatively wind resistant and is lightweight and so is ideally suitable for insulating purposes. As previous mentioned, because of the sturdiness and the strength of the material, its ease of use and its construction, it can stored for extended periods of time without decomposition or deterioration of its qualities. Also, it can be manufactured over wide ranges of performance standards. The wicking action of the knap is excellent because it draws moisture away from the skin of the wearer of the garment. Additionally, the extension of the knap beyond the foil tends to produce a thermal insulating layer of air pockets and also protects the foil layer from cotact with the skin which would tend to wear it away or possibly corrode the material.

Additionally, the method of manufacturing the device is beneficial in that the amount of cushioning and absorbing material can easily be varied; the absorbancy of the finished product can easily be adjusted during the manufacturing process; the manufacturing process requires a minimum of hand operations and can be highly automated and is very accurate and easily controlled.

Although a preferred embodiment of the invention has been disclosed and described in detail herein, it should be understood that this invention is in no sense limited thereby and its scope is to be determined by that of the appended claims.

What is claimed is:

1. A textured non-woven reflective insulating laminate fabric comprising:
   a base layer of continuous pliable non-woven non-metallic material;
   a continuous layer of heat reflective metal foil on one side of said pliable non-woven non-metallic sheet;
   a layer of fiber wadding on the other side of said non-woven non-metallic sheet;
   a nap of fibers extending from said layer of metal foil formed from fibers of said layer of wadding passing through said layer of continuous pliable non-woven non-metallic material and said layer of metal foil; and
   said fibers of said nap being of sufficient weight to both act to carry moisture past said reflective sheet and layer of pliable continuous non-woven non-metallic material, and to maintain reflectivity of said reflective layer of metal foil.

2. The laminate fabric of claim 1 wherein the said layer of foil is an aluminum foil, the base layer is a polyethylene, and the fiber wadding is wool.

3. The laminate fabric of claim 1 wherein the said layer of foil is aluminum foil.

4. The laminate fabric of claim 1 wherein the said base layer is high density polyethylene.

5. The laminate fabric of claim 1 wherein the said fiber wadding layer is wool.

6. The laminate fabric of claim 5 wherein the said high density polyethylene is of relatively low moisture permeability and low air permeability.

7. The laminate fabric of claim 1 wherein the base material is high density polyethylene.

8. The laminate fabric of claim 1 wherein said continuous layer of heat reflective metal foil on one side of said pliable non-metallic material is vacuum plated to said layer of continuous pliable non-woven non-metallic material.

9. The laminate fabric of claim 1 wherein said continuous layer of heat reflective metal foil on one side of said pliable non-woven non-metallic layer is secured to said non-woven non-metallic layer by means of bonding.

10. The laminate fabric of claim 1 wherein the fibers of said fiber wadding made of monofilament fibers selected from the group of dacron, nylon, rayon.

11. The laminate fabric of claim 1 wherein said fibers of said nap passed through said layer of continuous pliable non-woven, non-metallic material and said layer of continuous heat reflective metal foil and secure said layer of fiber wadding to said layer of continuous pliable non-woven non-metallic material.

12. The laminate fabric of claim 11 wherein said fibers forming said nap act to secure said layer of continuous heat reflective metal foil to said layer of continuous pliable non-woven non-metallic material.

13. The laminate fabric of claim 11 wherein said nap of fibers forms a layer beyond the layer of heat reflective metal foil to provide insulation.

14. The laminate fabric of claim 11 wherein the said nap formed from the fibers of said fiber wadding provides a cushioning surface above the layer of continuous heat reflective metal foil.

15. A textured non-woven reflective insulating laminate fabric comprising:
   a base layer of continuous pliable non-woven non-metallic material;
   a continuous layer of heat reflective metal foil on one side of said pliable non-woven non-metallic sheet;
   a layer of fiber wadding on the other side of said non-woven non-metallic sheet;
   a nap of fibers extending from said layer of metal foil formed from fibers of said layer of wadding passing through said layer of continuous pliable non-woven non-metallic material and said layer of metal foil; and
   said fibers of said nap being of sufficient weight to carry moisture past said reflective sheet and layer of pliable continuous non-woven non-metallic material, and to maintain reflectivity of said reflective layer of metal foil;

said layer of foil is aluminum foil;

said base layer is high density polyethylene;

said fiber wadding made of monofilament fibers selected from the group of dacron, nylon, rayon; said high density polyethylene is of relatively low moisture permeability and low air permeability;

said continuous layer of heat reflective metal foil on one side of said pliable non-metallic material is vacuum plated to said layer of continuous pliable non-woven non-metallic material;

said fibers of said nap passed through said layer of continuous pliable non-woven non-metallic material and said layer of continuous heat reflective metal foil to secure said layer of fiber wadding to said layer of continuous pliable non-woven non-metallic material;

said nap of fibers forms a layer beyond the layer of heat reflective metal foil to provide insulation; and said nap formed from the fibers of said fiber wadding provides a cushioning surface above the layer of continuous heat reflective metal foil.

16. A light weight, wind resistant reflective insulating lining for wearing apparel comprising:

a base layer of continuous pliable non-woven non-metallic material;

a continuous layer of heat reflective metal foil on one side of said pliable non-woven non-metallic sheet;

a layer of fiber wadding on the other side of said non-woven non-metallic sheet;

a nap of fibers extending from said layer of metal foil formed from fibers of said layer of wadding passing through said layer of continuous pliable non-woven non-metallic material and said layer of metal foil; and said fibers of said nap acting to carry moisture past said reflective sheet and layer of pliable continuous non-woven non-metallic material, said nap being of sufficient weight to maintain reflectivity of said reflective layer of metal foil.

17. A process of manufacturing a textured non-woven reflective insulating laminate fabric comprising:

providing a layer of continuous pliable non-woven non-metallic material;

providing a layer of continuous heat reflective metal foil on one side of said layer of continuous pliable non-woven non-metallic material;

providing a layer of fiber wadding on the other side of said non-woven non-metallic layer; and forming a nap of threads extending from said layer of continuous heat reflective metal foil by passing said threads through said layer of continuous pliable non-woven non-metallic material and said layer of continuous heat reflective metal foil, said nap being of sufficient weight to maintain reflectivity of said reflective layer of metal foil.

18. The process of manufacture of claim 17 wherein the layer of foil is an aluminum foil, the base layer is a polyethlyene, and the fiber wadding is wool.

19. The process of manufacture of claim 17 wherein the layer of foil is aluminum foil.

20. The process of manufacture of claim 17 wherein the base layer is high density polyethylene.

21. The process of manufacture of claim 17 wherein the fiber wadding layer is wool.

22. The process of manufacture of claim 17 wherein the high density polyethylene is of relatively low moisture permability and low air permeability.

23. The process of manufacture of claim 17 wherein the base material is high density polyethylene.

24. The process of manufacture of claim 17 wherein said continuous layer of heat reflective metal foil on one side of said pliable non-metallic material is vacuum plated to said layer of continuous pliable non-woven non-metallic material.

25. The process of manufacture of claim 17 wherein said continuous layer of heat reflective metal foil on one side of said pliable non-woven non-metallic layer is secured to said non-woven non-metallic layer by means of bonding.

26. The process of manufacture of claim 17 wherein the fibers are made of monofilament fibers selected from the group of dacron, nylon, rayon.

27. The process of manufacture of claim 17 wherein said nap are passed through said layer of continuous pliable non-woven non-metallic material and said layer of continuous heat reflective metal foil and secure said layer of fiber wadding to said layer of continuous pliable non-woven non-metallic material.

28. The process of manufacture of claim 17 wherein said fibers forming said nap act to secure said layer of continuous heat reflective metal foil to said layer of continuous pliable non-woven non-metallic material.

29. The process of manufacture of claim 17 wherein said nap of fibers forms a layer beyond the layer of heat reflective metal foil to provide for insulation.

30. The process of manufacture of claim 17 wherein the nap formed from the fibers of said fiber wadding provides a cushioning surface above the layer of continuous heat reflective metal foil.

31. A process of manufacturing a textured non-woven reflective insulating laminate fabric comprising:

providing a layer of continuous pliable non-woven non-metallic material;

providing a layer of continuous heat reflective metal foil on one side of said layer of continuous pliable non-woven non-metallic material;

providing a layer of fiber wadding on the other side of said non-woven non-metallic layer; and forming a nap of threads of fibers on said metal foil from said layer of fiber wadding by needle punching said layer of fiber wadding to pass fibers through the layer of continuous pliable non-woven non-metallic material and said continuous layer of heat reflective metallic foil, said nap being of sufficient weight to maintain reflectivity of said reflective layer of metal foil.

32. A process of manufacturing a textured non-woven reflective insulating laminate fabric comprising:

providing a base layer of continuous pliable non-woven non-metallic material;

providing a continuous layer of heat reflective metal foil on one side of said pliable non-woven non-metallic sheet;

providing a layer of fiber wadding on and in direct contact with the other side of said non-woven non-metallic sheet;

forming a nap of fibers extending from and in direct contact with said layer of metal foil formed from fibers of said layer of wadding passing through said layer of continuous pliable nonwoven non-metallic material and said layer of metal foil; and said fibers of said nap being of sufficient weight to carry moisture past said reflective sheet and layer of pliable continuous non-woven non-metallic material, and to maintain reflectivity of said reflective layer of metal foil;

said layer of foil is aluminum foil;

said base layer is high density polyethylene;

said fiber wadding made of monofilament fibers selected from the group of dacron, nylon, rayon;

said high density polyethylene is of relatively low moisture permeability and low air permeability;

said continuous layer of heat reflective metal foil on one side of said pliable non-metallic material is vacuum plated to said layer of continuous pliable non-woven non-metallic material;

said fibers of said nap passed through said layer of continuous pliable non-woven non-metallic material and said layer of continuous heat reflective metal foil to secure said layer of fiber wadding to said layer of continuous pliable non-woven non-metallic material;

said nap of fibers forms a layer beyond the layer of heat reflective metal foil to provide insulation; and said nap formed from the fibers of said fiber wadding provides a cushioning surface above the layer of continuous heat reflective metal foil.

* * * * *